United States Patent [19]

Sellars

[11] 4,039,014
[45] Aug. 2, 1977

[54] AUTOMATIC CAR WASH APPARATUS AND SIDE BRUSH ASSEMBLY FOR WASHING CARS OF VARYING WIDTHS

[76] Inventor: James H. Sellars, 1818 Bigelow N., Seattle, Wash. 98109

[21] Appl. No.: 579,668

[22] Filed: May 21, 1975

[51] Int. Cl.² .............................................. B60S 3/06
[52] U.S. Cl. .............................. 15/53 AB; 15/DIG. 2
[58] Field of Search ........... 15/DIG. 2, 53 A, 53 AB, 15/97 B

[56] References Cited

U.S. PATENT DOCUMENTS

| | | | |
|---|---|---|---|
| 3,237,229 | 3/1966 | Weigele et al. | 15/53 AB |
| 3,456,275 | 7/1969 | Solomon | 15/53 AB |
| 3,523,320 | 8/1970 | Williams | 15/53 AB |
| 3,593,357 | 7/1971 | Oldham | 15/53 AB |
| 3,720,972 | 3/1973 | Ennis | 15/DIG. 2 |
| 3,750,212 | 8/1973 | Bernardi | 15/53 AB |
| 3,931,660 | 1/1976 | Capra | 15/DIG. 2 |

FOREIGN PATENT DOCUMENTS

| | | | |
|---|---|---|---|
| 1,944,986 | 4/1971 | Germany | 15/DIG. 2 |

*Primary Examiner*—Edward L. Roberts
*Attorney, Agent, or Firm*—Dowrey & Cross

[57] ABSTRACT

The car wash apparatus includes two opposed side brush assemblies, each comprised of two brushes supported by respective independently powered arms pivotally mounted upon a common pivot member. The arms are of such angular configurations that, with respect to the apparatus centerline, the opposed side brushes can be swung oppositely to and from overlapping washing positions so disposed that the side and end surfaces of the car are fully contacted, regardless of the width of the car. Contact pressure applied by each brush is controlled and independently maintained substantially constant such that substantially the same brush contact pressure is applied to cars of varying widths. To minimize length, the pivot members of the two side brush assemblies are located directly opposite one another. Additionally, the apparatus may include a rotatable top brush assembly including angular arms capable of washing the top surfaces of automobiles, trucks, vans and the like.

14 Claims, 14 Drawing Figures

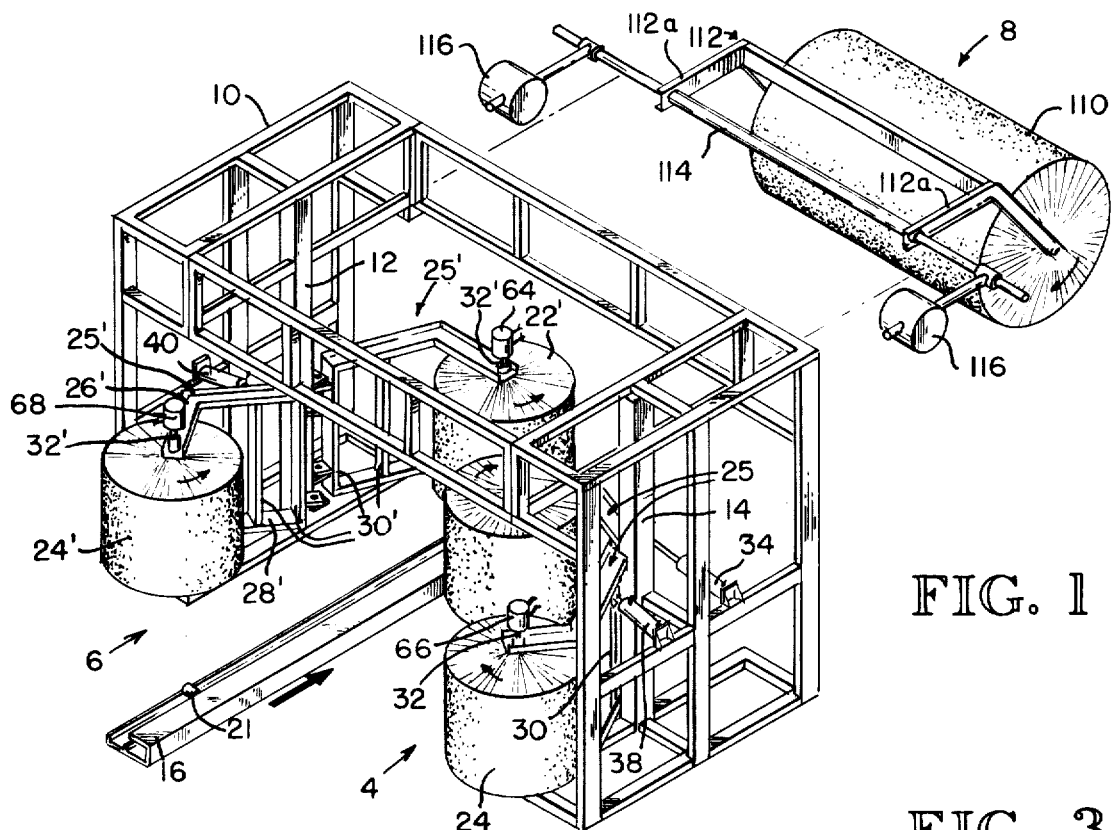
FIG. 1
FIG. 3
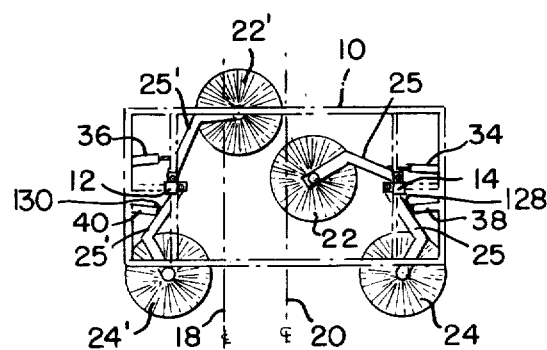
FIG. 1A
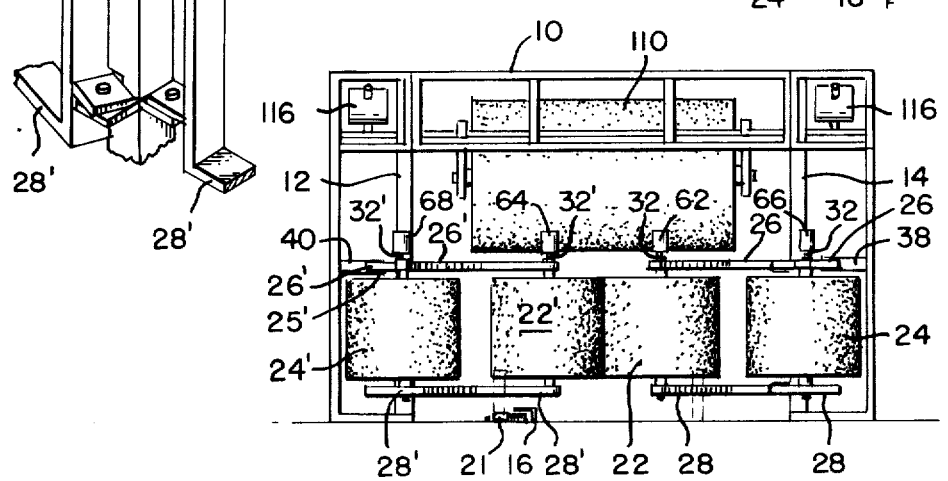
FIG. 2

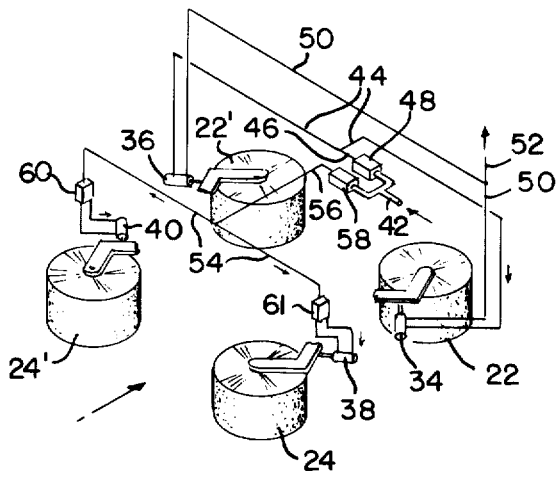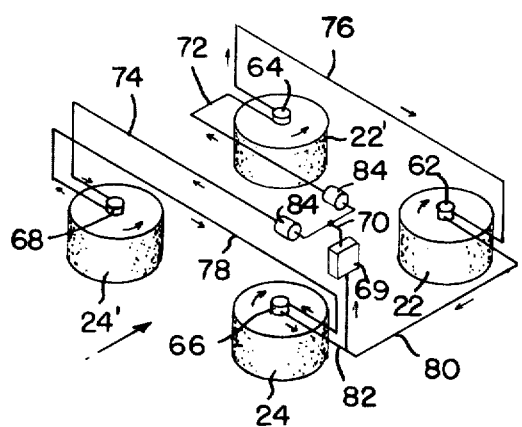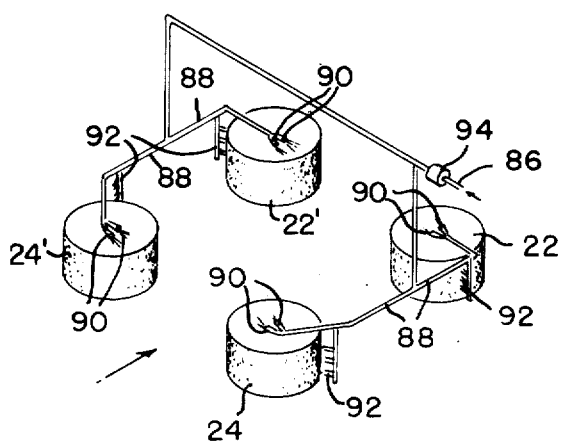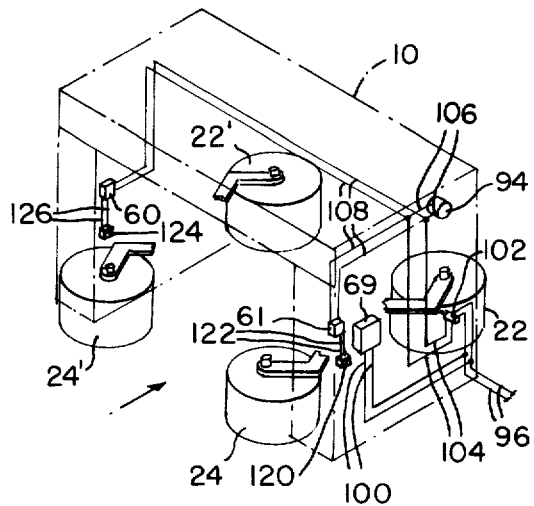

AUTOMATIC CAR WASH APPARATUS AND SIDE BRUSH ASSEMBLY FOR WASHING CARS OF VARYING WIDTHS

BACKGROUND OF THE INVENTION

This invention relates to automatic car washing apparatus, and to brush assemblies therefor. A used herein, the term "car" refers to automobiles, vans, panel trucks, light trucks, and similar vehicles.

Automatic car washing apparatus commonly include several spaced apart rotatable brushes between which the car is advanced, usually by means of a chain conveyor, and guided by a wheel track which engages the wheels of one side of the car, for example, the driver or left side. The brushes are located adjacent a washing station at which the surfaces of the car are wetted by water and a cleaning agent. To clean the top of the car, a top brush is rotatably supported for rotational movement about a horizontal axis by arms which are pivotally mounted above the washing station to swing the top brush into and out of engagement with the upper surface of the car. To clean the sides and ends of the car, one or more side brushes are rotatably supported for rotational movement about vertical axes by arms which are pivotally mounted adjacent the sides of the washing station to swing the side brush or brushes horizontally into and out of engagement with first the front end surface of the car, and then the sides and rocker panels, and finally the rear end surface of the car, as the car is advanced through the washing station. To ensure proper cleaning of the side and end surfaces of the car, conventional car wash apparatus merely position a series of brushes at spaced apart locations along the washing station, each brush being operated to clean a specific surface. Consequently, such apparatus tend to be extremely long in order to accommodate all these brushes and it is often difficult to provide and maintain adequate brush position control and contact pressure. See, for example, U.S. Pat. No. 3,332,098, issued to Smith.

To increase cleaning efficiency with minimum complexity, therefore, it is desirable to utilize a single side brush assembly to clean several car surfaces. Typically two commonly pivoted brushes are employed in this type of side brush assembly—one to clean the front and side, the other to clean the side and rear surfaces of the car—as disclosed in U.S. Pat. No. 3,327,229 to Weigele, et al. and U.S. Pat. No. 3,688,328 to Wilkins. To provide car wash apparatus for cleaning both sides and ends of the car, two such side brush assemblies are employed. Inasmuch as the brushes of each side brush assembly are resiliently interconnected, however, these prior side brush assemblies cannot adequately wash cars of varying widths. The driver or left side brush assembly operates properly regardless of car width because that side of the car is positioned, with respect to the left side brush assembly, by the wheel track; however, the relative positions of the passenger or right side brush assembly and the right side and end car surfaces can vary, depending upon the width of the car, such that the right side brushes permaturely snap back from, completely miss, or exert insufficient cleaning pressure upon the right side and rear end surfaces of the car. The end result is that only cars of standard width, which can be drawn through the washing station such that the car and washing apparatus centerlines substantially coincide, receive a thorough and complete cleaning. Another problem associated with such operation of the right side brushes is that brush penetration and contact pressure applied can vary, or the cleaning work load is distributed unevenly among the four side brushes, depending upon the width of the car, with resultant decreased brush life, and hence increased operating cost. Further, due to the conjoint movement of the brushes produced by resiliently interconnecting them, it is necessary, in order to prevent opposite brushes from clashing with one another at their cleaning positions, to stagger opposite brush assemblies along the path of car advance. Consequently, as is the case with multiple brush conventional car wash apparatus described previously, the resulting apparatus is of undersirable length and complexity.

SUMMARY OF THE INVENTION

Car wash apparatus according to this invention broadly comprises brush means including independently operable brushes, and brush control means for independently maintaining the brush contact pressure applied substantially constant such that substantially the same contact pressure is applied to cars of varying widths.

According to one preferred embodiment of the invention, the brush means are made up of two opposed side brush assemblies, each including two rotatable brushes and two commonly pivoted brush support means respectively pivotally supporting the brushes such that each can swing independently. Each brush support means includes rigidly interconnected arms of such angular configurations that, with respect to the apparatus centerline, opposed brushes can be swung to and from overlapping washing positions so disposed that the side and end surfaces of the car are fully contacted, regardless of the width of the car. The brush control means includes brush positioning means respectively exerting controlled rotational effort upon and independently swinging the brush support means such that substantially constant brush contact pressure is applied, regardless of the width of the car. The brush positioning means include four powered reciprocative operatives respectively operatively associated with the four brushes. While preferably these operators are pneumatic cylinders, other types of reciprocative and nonreciprocative operators may be used, if desired.

Thus, it will be appreciated from the foregoing summary that it is possible, by controlling and independently maintaining brush contact pressure substantially constant, regardless of car width, to equally distribute work load among the brushes while controlling and maintaining substantially constant brush penetration. The end result is longer brush life and increased cleaning efficiency. The angular arm configuration permits the arms to "wrap around" the front and rear ends of the car from their common pivot, and to traverse the front and rear corners of the car, as well as the various car surfaces, without hang up or fluctuation in brush contact pressure. Further, each brush follows substantially the same arc on every washing stroke, thereby ensuring positive control and positioning of all brushes, regardless of car width. By virtue of the common brush pivot, the side brush assemblies may be positioned directly opposite one another, thereby minimizing length of the apparatus, and moved independently in controlled sequence to provide double cleaning coverage of the car side surfaces. To further extend brush life, the brushes may be saturated with washing fluid simultaneously with application of such fluid to the car surfaces.

Addtionally, the apparatus may include a rotatable top brush assembly including angular arms capable of washing the top surfaces of automobiles, trucks, vans and the like.

These and other features, objects, and advantages of the invention will become apparent from the detailed description and claims to follow taken in conjunction with the accompanying drawings in which like parts bear like reference numerals.

BRIEF DESCRIPTION OF THE DRAWINGS

FIG. 1 is a perspective of a modular unit which includes a top brush assembly and two side brush assemblies of this invention;

FIG. 1A is a fragmentary perspective on expanded scale of one vertical pivot member of the unit of FIG. 1;

FIG. 2 is a side elevation of the modular unit of FIG. 1;

FIG. 3 is a top view of the modular unit of FIG. 1;

FIG. 4 is a schematic outline of the brush positioning and control system for the modular unit of FIG. 1;

FIG. 5 is a schematic outline of the hydraulic brush drive system for the modular unit of FIG. 1;

FIG. 6 is a schematic outline of the washing fluid application system for the modular unit of FIG. 1;

FIG. 7 is a schematic outline of the electric control system for the modular unit of FIG. 1;

DETAILED DESCRIPTION OF THE DRAWINGS

Figure 11:
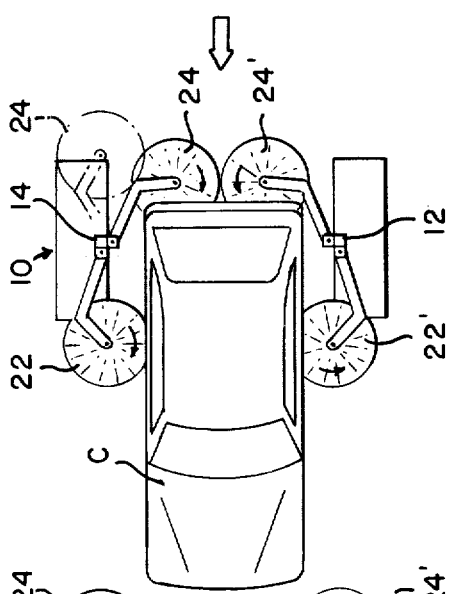
FIGS. 8-13 are schematics depicting operation of the modular unit of FIG. 1.

The automatic car wash apparatus of this invention comprises two opposed side brush assemblies 4 and 6 and a top brush assembly 8. These three brush assemblies are fabricated as a modular unit of compact construction illustrated in FIGS. 1-3 of the drawings. The modular unit is made up of an inverted generally U-shaped main frame 10 comprising vertical and horizontal support members which rigidly support and serve to interconnect two spaced apart, parallel, vertical pivot members 12 and 14. In the example of FIG. 1, a straight wheel track 16 extends underneath and through the main frame opening which constitutes a washing station. The wheel track is positioned with its centerline 18 (FIG. 3) parallel to and spaced laterally from the main frame centerline 20 so that it can engage the driver or left side wheels of and guide a car (not shown) underneath and through the frame 10 as the car is advanced by a chain conveyor 22 in the direction indicated by the large arrow. The wheel track 16 and chain conveyor 21 are or may be of conventional design and construction. It will be recognized that, in many retrofit and other applications, the frame 10 may be eliminated and the pivot members 12 and 14 secured or mounted separately to existing on-site structure.

The side brush assemblies 4 and 6 of FIGS. 1-3 are generally similar. The passenger or right side brush assembly 4 of FIG. 1 is described herein with reference numerals. Like parts of the driver or left side brush assembly 6 of FIG. 1 are designated with the same reference numerals, primed. The right side brush assembly includes two rotatable side brushes 22 and 24. Each side brush is pivotally supported by a generally U-shaped support frame 25 comprised of upper and lower arms 26 and 28 which are rigidly interconnected by two vertical frame members 30. Each brush is mounted by a vertical shaft 32, the ends of which are rotatively supported between the inner ends of the upper and lower arms 26 and 28 for rotational movement about a vertical axis. The frame 25 are pivotally mounted by the common pivot member 14 to swing horizontally between extended cleaning positions and retracted positions (brush 22 extended and brush 24 retracted in FIGS. 1-3). Likewise, the left brush support frames 25' are pivotally mounted by the common pivot member 12. Suitable limit stops (not shown) may be provided to cushion and absorb shock as well as to determine the limits of travel of the frames 25 and 25'.

The illustrated brushes are or may be conventional. Typically, such brushes are made up of a number of long flexible bristles which are simultaneously thrown outwardly into a generally cylindrical configuration as the brush is rotated about its longitudinal axis. In the example of FIGS. 1-3, the brushes are illustrated in their rotational conditions. The term "brush penetration" as used herein refers to the length of each brush bristle tip portion which contacts the car surface as the brush is rotating. Brush penetration appears as the flattened portion of the cylindrical path followed the bristle tip portions as the brush contacts the car surface, as depicted in FIGS. 9-12. Similarly, the term "contact pressure" as used herein refers to the pressure applied by the bristle tip portions as they rotate against and are deflected by the car surface, depending upon the amount of brush penetration. The greater the brush penetration, and hence contact pressure applied, the greater the brush wear.

Each of the arms 26, 26', 28 and 28' is of angular configuration, although a curved configuration may be used, if desired. By virtue of this configuration, the arms of each side brush assembly are able to "wrap around" and clean both ends of a car from their common pivot location. As depicted in FIG. 3, the arms are of sufficient length that, with respect to the frame centerline 20, their respective brushes can be swung arcuately to overlap or intersect the arc traveled by their opposite counterparts, and hence provide full washing coverage of the front and rear ends of the car. The lengths of travel of the right side brushes on their respective arcs, of course, will vary depending upon the width of the car. To this end, the control system of this invention, presently to be described, automatically compensates for variations in width of the cars which may be cleaned such that the brushes of the right side brush assembly are properly positioned at desired brush penetration and contact pressure, regardless of car width. Consequently, the four side brushes 22, 22', 24 and 24' are capable of cleaning both ends, as well as the sides, of cars of varying widths, with minimum brush wear.

As will be understood by referring in particular to FIG. 3, the pivot members 12 and 14 are located directly opposite each other. The main frame 10 is of sufficient length, measured along the path of car advance indicated, to provide stability and proper support for the side brush assemblies as the side brushes are swung in and out, as shown (FIGS. 8-13). Thus, it is possible, by mounting the side brushes 22 and 24, 22' and 24° upon respective common pivot members 14 and 12 and positioning these members directly opposite one another, to acheive a considerable reduction in length. Consequently, the modular unit of FIG. 1 is of extremely compact construction and is readily adapted to use in a wide variety of applications and environments.

To prevent the side brushes from clashing with their opposite counterparts, the brush positioning and control system independently swings the brush in controlled predetermined sequence to and from their extended washing positions.

The support frames 25 and 25' of the left and right side brush assemblies are swung between their extended and retracted positions by the brush positioning and control system of FIG. 4. This system includes four reciprocative powered operators 34, 36, 38, 40 (see FIG. 3), preferably pneumatic or air operated power cylinders, which respectively control the position of and independently maintain the contact pressure applied by the four side brushes 22, 22', 24, and 24'. Cylinders 34 and 36 are single acting toward their extended positions; however, cylinders 38 and 40 are double acting and automatically reversible. More specifically, the single acting cylinders 34 and 36 are continuously supplied with air pressure at one end (e.g. outboard end) via lines 50, as shown (FIG. 4), and, hence, are continuously driven toward their extended positions. Double acting automatically reversible cylinders 38 and 40 are selectively supplied with air pressure via valves 61 and 60 which are controlled with respect to the position of brush 22, and cylinders 38 and 40, as will be described presently. Each valve is connected to both ends (inboard and outboard) of its associated cylinder by two parallel branch lines, as shown (FIG. 4), and pressurizes these lines (thereby applying air pressure to the ends of cylinders 40 and 38) in alternate sequence so that, as will be appreciated by one of ordinary skill in the art, cylinders 38 and 40 will first move in one direction until reaching a predetermined reversal position, and then will move in the opposite direction back to their original positions. The reversal positions of cylinders 38 and 40 are sensed by appropriate position sensors well known in the art, as indicated in U.S. Pat. No. 3,332,098 to Smith. Thus, cylinders 34 and 36 are continuously driven toward their extended positions, whereas cylinders 38 and 40 are first driven toward their extended positions, and then, upon reaching their extended positions, are immediately reversed and driven back toward their contracted positions. Each cylinder is mounted between a respective intermediate support frame member 30 and 30' and the frame 10 in such a manner that extension thereof causes rotational effort to be applied to and produced swinging movement of the respective support frame toward its extended washing position. Additionally, contraction of cylinders 38 and 40 produces reverse swinging movement of their respective support frames toward their retracted positions.

The amount of rotational effort applied by each of cylinders 34, 36, 38 and 40 is controlled to produce brush penetration, and hence contact pressure, sufficient to thoroughly clean the car surface against which its respectively associated brush is rotated, without excessive brush wear. The rotational effort applied further is maintained substantially constant, regardless of the width of the car being cleaned. Thus, it is possible, by independently controlling the position of and the rotational effort applied to each brush support frame, to independently maintain contact pressure applied by brushes 22, 22', 24 and 24' substantially constant. Consequently, longer brush life and increased cleaning efficiency are obtained, regardless of car width. It will be recognized that the brushes may be controlled independently by other means.

Referring now in particular to FIG. 4, pressurized air from a pressure source (not shown) is supplied to an inlet line 42 and fed to cylinders 34, 36, 38, and 40. The cylinders 34 and 36 are connected in parallel by branch lines 44 to a common main line 46 which in turn is connected through an air regulator 48 to the inlet line 42. Branch lines 50 connect these cylinders to a vent 52. The cylinders 38 and 40 are connected in parallel independently of cylinders 34 and 36 by branch lines 54 to a common main line 56, through a second independent air regulator 58 and to the inlet line 42. Electrically operated control valves 60 and 61 disposed in branch lines 54 control the supply of air to cylinders 40 and 38, respectively.

The four side brushes are simultaneously rotated by the directions indicated by arrows in FIG. 1 by the brush drive system of FIG. 5. Preferably, the brush drive system comprises four hydraulic motors 62, 64, 66 and 68 which are respectively directly connected with brushes 22, 22', 24 and 24'. These motors are mounted vertically upon the upper arms 26 and 26' with their drive shafts in vertical axial alignment with and directly coupled to the respective shafts 32 and 32'. Thus, complicated power transmission means, such as are commonly used in conventional car wash apparatus to transmit power from a remote motor to the brush or brushes, are eliminated. Consequently, by virtue of the double ended support of each brush shaft, coupled with such direct connection of the motors 62, 64, 66, and 68 to their respective brushes, vibration produced by rotation of the brushes is elimated or substantially minimized.

An electrically operated hydraulic power source 69 provides hydraulic pressure fluid for driving the motors 62, 64, 66 and 68. Pressure fluid is fed along input line 70 to parallel branch lines 72 and 74, leading to motors 64 and 68, and then to motors 62 and 66 along lines 76 and 78, respectively. Lines 80 and 82 return pressure fluid from the latter motors back to the power source 68. Flow control valves 84 control and maintain flow of hydraulic pressure fluid to and from the power source 69 in the directions indicated by arrows.

The water system of FIG. 6 sprays cleaning fluid made up of water and a cleaning agent against the car surfaces to be cleaned as well as continuously wets the side brushes themselves. The water system include an inlet line 86, which supplies water and cleaning agent to branch lines 88. Each branch line feeds two sets of spray nozzles or jets located adjacent each brush. One set of nozzles 90 directs water and cleaning agent against the car surface. The other nozzle set 92 directs water and cleaning agent against and into the brushes themselves. Thus, the brushes are continuously wetted, and hence remain soft and pliable during operation. The end result is increased brush life and cleaning efficiency. An electrical control valve 94 controls the flow of water and cleaning agent to the spray nozzles 90 and 92.

Figure 8:
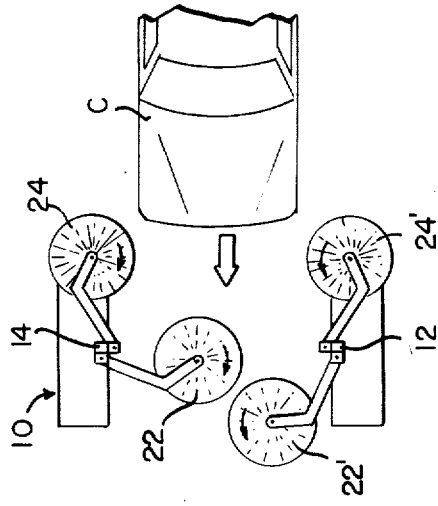

The side brushes are initially in the position depicted in FIG. 8 (this position also corresponds to that illustrated in FIG. 1). In this initial position, the brushes 22 and 22' are positioned at their staggered fully extended positions by stop means (not shown). The brushes 24 and 24' are in their fully retracted positions in which they avert from the path of car advance through the main frame. Additionally, brushes 22, 22', 24 and 24' are rotating simultaneously in the direction indicated by small arrows in FIGS. 3-13 under control of power source 69 of the brush drive system of FIG. 5. Power source 69 is operated by electrical power fed along electrical leads 96 and 100 (FIG. 7) from a source of electrical power (now shown) and is or may be operated in response to operation of the conveyor 21 of FIG. 1.

Figure 9:
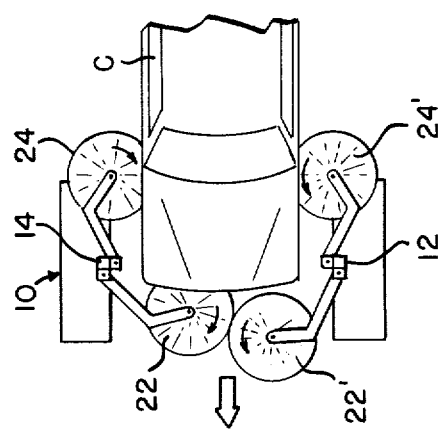

As the car C is advanced in the direction indicated by the large arrow in FIG. 8, it first passes between the retracted brushes 24 and 24', underneath the main frame 10, and enters the washing station. When the front end of the car has penetrated to about midway along the length of the main frame, it engages and swings brush 22 toward its retracted position. An electrical brush position sensor 102 (FIG. 7) is operated in response to such movement of brush 22. This sensor is connected electrically by leads 104 and 106 with valve 94 of the water system of FIG. 6, which then causes water and liquid cleaning agent to be applied to the car surfaces and the brushes. Additionally, valves 61 and 60, connected electrically with sensor 102 by electrical leads 104 and branch leads 108, cause air pressure to be applied only to one end (eg. outboard end) of each cylinder to produce extension thereof. The power cylinders 38 and 40 (FIG. 4) thus simultaneously swing the brushes 24 and 24' toward one another and into engagement with the sides and rocker panels of the car, as depicted in FIG. 9.

Figure 10:
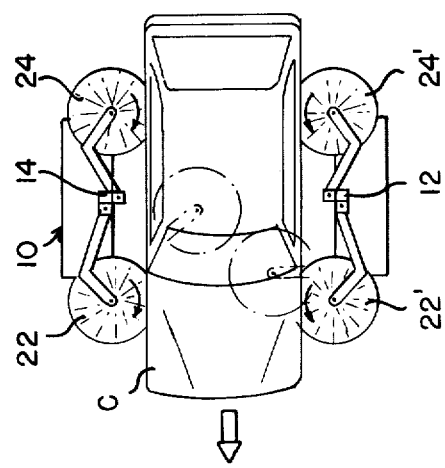

Upon further advancement of the car, the left brush 22' also engages the left front end portion of the car. Thereafter, as the front end of the car exits the washing station and begins to project outwardly from the opposite end of the main frame, both brushes 22 and 22' are simultaneously driven outwardly and around the front corners of the car and then into engagement with the front side portions of the car, as indicated in FIG. 10. Throughout such movement of the brushes 22 and 22', the brushes 24 and 24' engage and move rearwardly along the sides and rocker panels of the car, as the car is advanced. It will be appreciated that both brushes of each side brush assembly traverse a major portion of one side and the rocker panels. Consequently, these portions of the car, which commonly are the dirtiest, are subjected to a double cleaning coverage which ensures that they will be cleaned throughly and completely.

Figure 12:
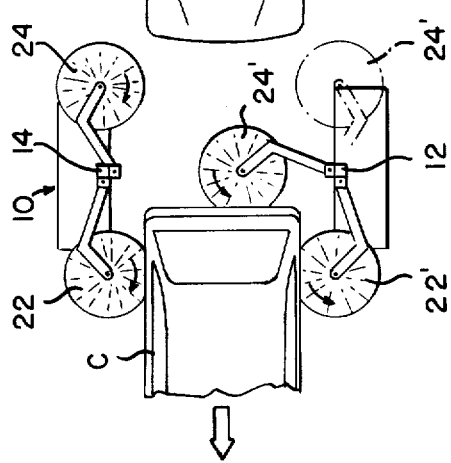
Figure 13:
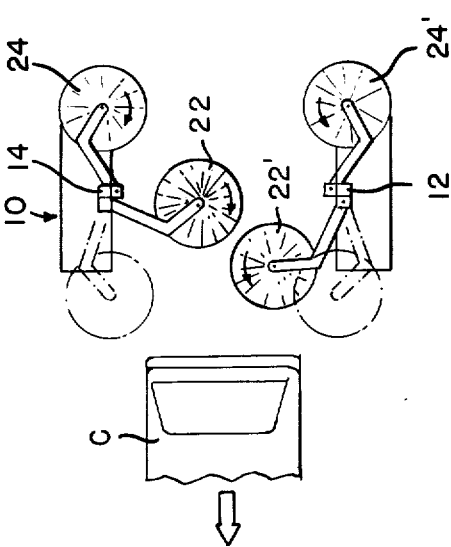

As the rear end of the car approaches the midpoint of the main frame, as depicted in FIG. 11, the brushes 24 and 24' simultaneously round the rear corners of the car and are swung oppositely toward one another by their respective power cylinders 38 and 40 until, as depicted in FIG. 11, these brushes are abreast one another and engage adjacent portions of the rear end of the car. At this point, appropriate position sensing means 120 associated with cylinder 38 send an electrical signal via electrical leads 122 to valve 61 which thus is moved to its reversal position in which air pressure is applied only to the other end (e.g. inboard end) of cylinder 33 via the other illustrated brush line. Consequently, cylinder 38 terminates further rotational movement of the right brush 24 and swings it back toward its retracted position. Thus, upon continued advancement of the car, the left brush 24' can be swung by cylinder 40 to its fully extended position of FIG. 12 in which it overlaps the fully extended position of brush 24. At this position, appropriate position sensing means 124 associated with cylinder 40 send an electrical signal via electrical leads 126 to valve 60 which thus is moved to its reversal position in which air pressure is applied only to the other end (e.g. inboard end) of cylinder 40 via the other illustrated brush line. Consequently, cylinder 40 returns brush 24' to its retracted position, as depicted in FIGS. 12 and 13. The brushes 24 and 24' are now both fully retracted. It will be recognized by comparing FIGS. 11 and 12, that the full swing of brush 24 is less than the full swing of brush 24' (brush 24 fully extended in FIG. 11, brush 24' fully extended in FIG. 12), the extent of swing of both brushes being controlled by appropriate selection of the reversal points of cylinders 38 and 40; however, despite this difference in swing, brushes 24 and 24' do not tend to clash with one another because brush 24 is first retracted a sufficient distance to allow further swing of brush 24', as shown (FIGS. 11 and 12). Thus, it is possible, by overlapping and staggering the fully extended positions of the brushes with respect to centerline 20 and swinging them to and from their extended washing positions in controlled sequence, to fully contact both end surfaces of the car without allowing the brushes to clash with one another.

As the car C leaves the washing station, its rear end passes between the brushes 22 and 22', as depicted in FIG. 13. The power cylinders 34 and 36 then return these brushes to their staggered fully extended initial positions of FIG. 1. The position sensor 102 is operated when the brush 22 returns to its fully extended position and causes the water system of FIG. 6 to be shut down. The car wash apparatus is now ready for another car. It will be recognized, of course, that conventional treadle or wand switches may be used to control and operate the various systems.

To prevent damage to the brushes 24 and 24' in the event a car attempts to enter the car wash apparatus when one or both brushes 24 and 24' are still at their extended washing positions (FIGS. 11 and 12), their support frames 25 and 25' are or may be pivotally supported to swing a full 180°. The support frame associated with brush 24', for example, is pivotally secured to pivot member face 12a which fronts upon and is parallel to centerline 20; however, the support frame associated with brush 22' is pivotally secured to adjacent face 12b which is perpendicular to and faces away from the path of car advance, as shown (FIG. 1A). The support frames 25 may be similarly secured to corresponding adjacent faces of member 14. Consequently, brushes 24 and 24' are able to swing conjointly with the car as it moves in the direction indicated by the arrow in FIG. 1 toward the brushes 22 and 22'. In this case, shear pin connections 128 and 130 are provided between cylinders 38 and 40 and support frames 25 and 25'. These connections are of a self-detachable nature to enable these frames to swing freely in response to application of sufficient impact force.

The top brush assembly 8 of this invention is depicted in FIG. 1. The top brush assembly comprises an elongated brush 110, generally similar to the side brushes described previously, which extends substantially the width of the main frame. Brush 110 is rotatably supported by a top brush support frame 112, secured to frame 10 as indicated, for rotational movement about a horizontal axis. Frame 112 includes two opposed arms 112a between which the brush 110 is mounted. These arms are of such angular configurations that the brush 110 is capable of cleaning the front and middle upper surfaces of most existing cars, including vans, panel trucks and light trucks. The frame 112 swings vertically about horizontal pivot member 114 and such that the top brush 110 can swing up and down into and out of the engagement with the top surface of the car. The top brush is rotated in the direction indicated by the arrow by means not shown.

To provide a top brush assembly for cleaning the top rear surfaces of such vehicles, as well as their rear windshields, an additional top brush assembly generally similar to that of FIG. 1 may be mounted on the opposite end of frame 10. In this case, the brush is rotated in a reverse direction and is counterweighted such that it remains elevated until the front portion of the car passes underneath it, at which time it then engages the top rear surfaces of the car. The arms 112a are of sufficient length to lower brush 110 across the rear windshield to bumper level, from which the brush is then swung back to its elevated retracted position.

While the preferred embodiments of the invention have been illustrated and described herein, it should be understood that variations will become apparent to one skilled in the art. For example, to provide additional rotational control of the right side brush assembly, the automatic car wash apparatus of this invention may include additional sensing means responsive to the width of the car for controlling the rotational position of and contact pressure applied by the right brush 22, or the right brush 24, or both right brushes 22 and 24 simultaneously. Accordingly, the invention is not to be limited to the specific embodiments illustrated and described herein and the true scope and spirit of the invention are to be determined by reference to the appended claims.

The embodiments of the invention in which an exclusive property or privilege is claimed are defined as follows:

1. Car wash apparatus, comprising: brush means including independently operable brushes for contacting the side end surfaces of a car as it is advanced through a washing station; and brush control means for independently maintaining the contact pressure applied by said brushes substantially constant such that substantially the same contact pressure is applied to cars of varying widths; wherein said brush means comprises frame means providing two directly opposed spaced apart members between which the car can be advanced through the washing station, and two side brush assemblies respectively operatively associated with said members; each side brush assembly including two rotatable brushes, first and second brush support means pivotally mounted by a respective one of said members for pivotally supporting said brushes such that each can swing independently relative to the respective member between an extended washing position projecting toward the path of car advance and a retracted position averted from the path of car advance; and wherein said brush control means comprises positioning means respectively exerting controlled rotational effort upon and independently swinging the first and second brush support means of said two side brush assemblies toward their extended washing positions such that substantially constant brush contact pressure is applied to cars of warying widths.

2. The apparatus of claim 1, wherein said first and second brush support means each comprises two vertically spaced apart rigidly interconnected arms rotatably supporting a respective one of said brushes therebetween for rotational movement about a generally vertical axis, and brush driver means connected directly with the one brush along said axis for moving it rotatively about said axis.

3. The apparatus of claim 1, wherein said first and second brush support means of the two side brush assemblies position said brushes such that they overlap one another and are staggered with respect to the path of car advance at their extended washing positions; and wherein said brush positioning means swing said brushes toward their extended positions in controlled sequence such that one brush of one side brush assembly contacts and partially overlaps a portion of the front end surface of the car contacted by the opposite brush of the other side brush assembly, and one brush of the other side brush assembly contacts and partially overlaps a portion of the rear end surface of the car contacted by the corresponding opposite brush of the one side brush assembly.

4. The apparatus of claim 1, wherein said first and second brush support means each comprises two vertically spaced apart rigidly interconnected arms of angular configurations.

5. The apparatus of claim 1, wherein said two members each include two adjacent mutually perpendicular faces, one of which is parallel to the path of car advance, and the other of which is perpendicular to and faces away from the path of car advance, and wherein said first and second brush support means of each side brush assembly are respectively secured pivotally to said two faces of their respectively associated members, and are detachably interconnected with the respective brush positioning means.

6. The apparatus of claim 1, further comprising top brush means pivotally supported by said frame means for cleaning the top surface of the car, said top brush means including a brush, two spaced apart arms rotatively supporting said brush for rotational movement about a generally horizontal axis, said arms being of angular configurations.

7. The apparatus of claim 1, further comprising fluid applicator means for applying washing fluid to the car surfaces and said brushes.

8. A side brush assembly for car wash apparatus, comprising; two rotatable brushes; first and second commonly pivoted brush support means respectively pivotally supporting said brushes such that each can swing independently; first and second brush positioning means respectively exerting controlled rotational effort upon and independently swinging said first and second brush support means such that substantially constant brush contact pressure is applied to cars of varying widths, said first brush positioning means being further operable for continuously exerting rotational effort to swing said first brush support means toward an extended position; and control means including position sensor means responsive to the position of said first brush support means for operating said second brush positioning means to swing said second brush support means toward an extended position; said second brush positioning means being further operable to swing said second brush support means in a reverse direction toward a retracted position upon reaching its extended position.

9. The brush assembly of claim 8, wherein said first and second brush support means each comprises two vertically spaced apart rigidly interconnected arms rotatably supporting a respective one of said brushes therebetween for rotational movement about a generally vertical axis, and brush drive means connected directly with the one brush along said axis for moving it rotatively about said axis.

10. The brush assembly of claim 8, wherein said first brush positioning means comprises reciprocative powered operator means continuously operable toward an extended position, said second brush positioning means comprising reciprocative powered operator means operable first toward an extended position and then toward a contracted position upon reaching its extended position.

11. The brush assembly of claim 8, further comprising fluid applicator means for applying washing fluid to the car surfaces and said two brushes.

12. The brush assembly of claim 8, further comprising a common vertical member pivotally supporting said first and second brush support means, said member including two adjacent mutually perpendicular surfaces to which said first and second brush support means are respectively secured pivotally, and further comprising means detachably interconnecting said second brush support means and said second brush positioning means.

13. The brush assembly of claim 8, wherein said first and second brush support means each comprises two vertically spaced apart rigidly interconnected arms of angular configurations.

14. Car wash apparatus, comprising: movable brush means for contacting the side and end surfaces of a car as it is advanced through a washing station, said brush means including a first brush mounted for pivotal movement along an arcuate path with respect to a first pivot located adjacent one side of the washing station, and a second brush mounted for pivotal movement with respect to a second pivot located adjacent the opposite side of the washing station in direct opposition to said first pivot, along an arcuate path which overlaps the path of movement of said first brush; and brush control means for causing said first and second brushes to move simultaneously in controlled sequence toward adjacent washing positions, and then causing one of said brushes to move relatively away from its washing position while simultaneously therewith moving the other of said brushes into an overlapping washing position for a sufficient distance to provide complete washing coverage of the rear end car surfaces.

* * * * *